United States Patent [19]
David

[11] Patent Number: 4,730,795
[45] Date of Patent: Mar. 15, 1988

[54] HELIPLANE

[76] Inventor: Constant V. David, 4952 Field St., San Diego, Calif. 92110

[21] Appl. No.: 833,667

[22] Filed: Feb. 26, 1986

Related U.S. Application Data

[63] Continuation-in-part of Ser. No. 593085, Mar. 26, 1984, abandoned.

[51] Int. Cl.[4] .................. B64C 27/22; B64C 27/54
[52] U.S. Cl. ........................ 244/6; 244/7 R; 244/17.21; 416/117; 416/167; 416/127
[58] Field of Search .............. 244/7, 6, 17.11, 17.21, 244/17.13; 416/167, 154, 127–129, 132 R, 164, 23, 117 A

[56] References Cited

U.S. PATENT DOCUMENTS

| | | | |
|---|---|---|---|
| 675,844 | 9/1900 | Williams et al. | 416/167 |
| 1,825,881 | 10/1931 | Matthey | 416/167 |
| 2,372,350 | 3/1945 | Abeel | 416/154 |
| 2,470,560 | 5/1949 | Hoover | 416/127 |
| 2,475,121 | 7/1949 | Avery | 416/132 R |
| 2,665,859 | 1/1954 | Papadakos | 244/7 R |
| 2,684,721 | 7/1954 | Lloyd | 416/117 A |
| 2,946,390 | 7/1960 | Pozgay | 416/117 A |
| 2,959,373 | 11/1960 | Zuck | 244/17.21 |
| 3,105,659 | 10/1963 | Stutz | 244/7 R |
| 3,155,341 | 11/1964 | Girard | 244/7 R |
| 3,464,651 | 9/1969 | Lightfoot | 244/6 |

*Primary Examiner*—Galen Barefoot

[57] ABSTRACT

The basic characteristics of an airplane and of a helicopter are combined into one flying craft: a HELIPLANE. This aircraft can fly forward like an airplane and hover like a helicopter. In the hovering mode, the craft lifting force is generated by gyrating blades and the craft control forces and moments are provided by a tail end propeller. In the forward flying mode, the craft lifting forces are generated by two wings and the gyrating blades. The propeller alone provides the forward propulsive thrust. The operations of the gyrating blades, of the craft control surfaces and of the power plant are all integrated, monitored and controlled to coordinate such operations during hovering, forward flight and any transition phase between hovering and forward flight. The gyrating blades never generate any forward propulsive thrust. The cyclic pitch motion of the gyrating blades needed to accommodate the craft forward flight velocity is induced by this forward velocity. Opposite gyrating blades are free to rotate around their longitudinal axes of rotation, but are solidly and rigidly connected to each other, so that both blades in any pair are always forced to rotate together by the same amount and in the same direction. The collective pitch of the gyrating blades is adjustable to meet the requirements of altitude, craft weight and rate of ascent changes which affect the upward lifting force needed. The complex dynamic behavioral response of helicopters to cyclic pitch variations, and the consequences thereof, are eliminated in the present invention. All control and actuating means of the gyrating blades are well protected and shielded from environmental hazards.

20 Claims, 25 Drawing Figures

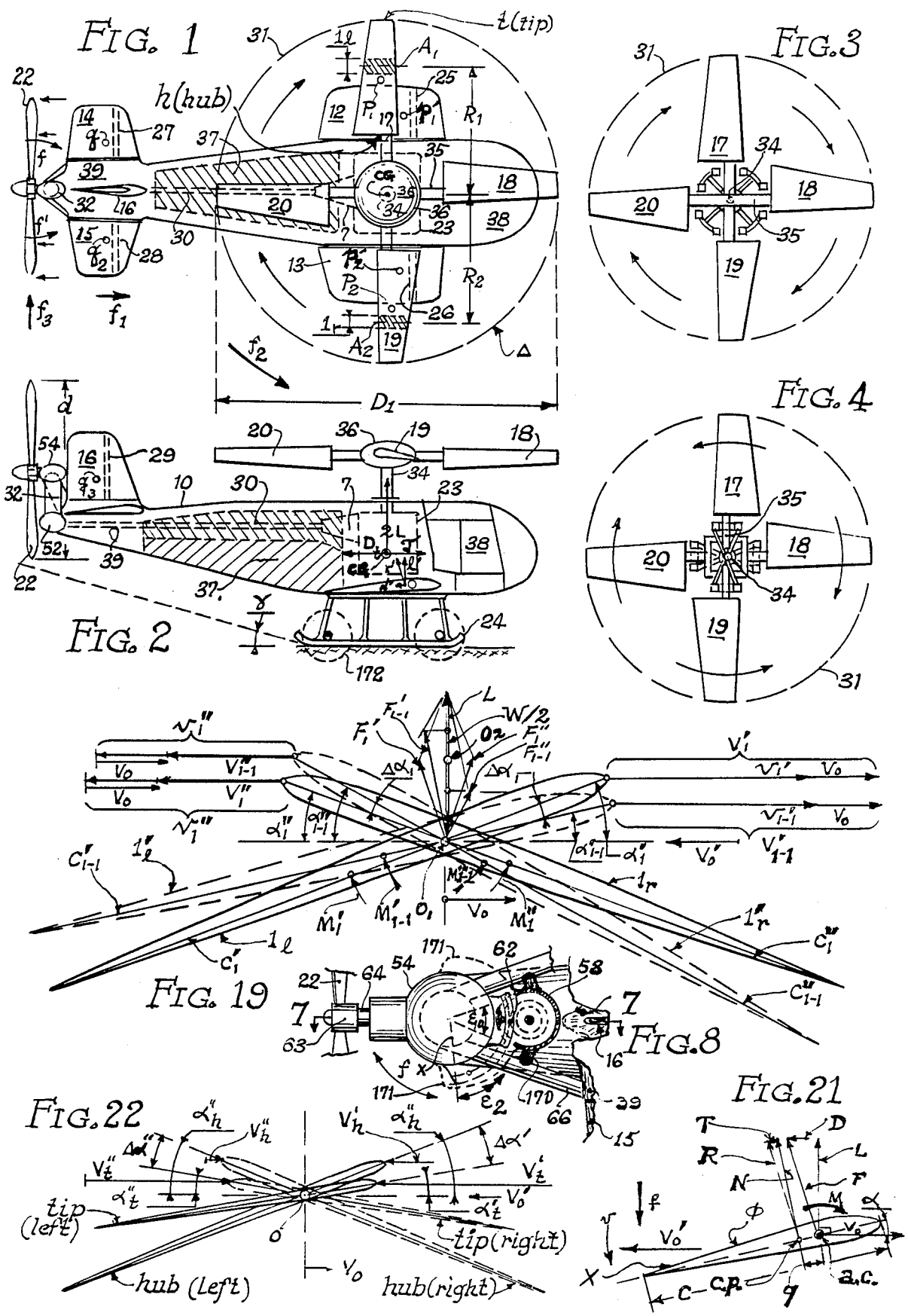

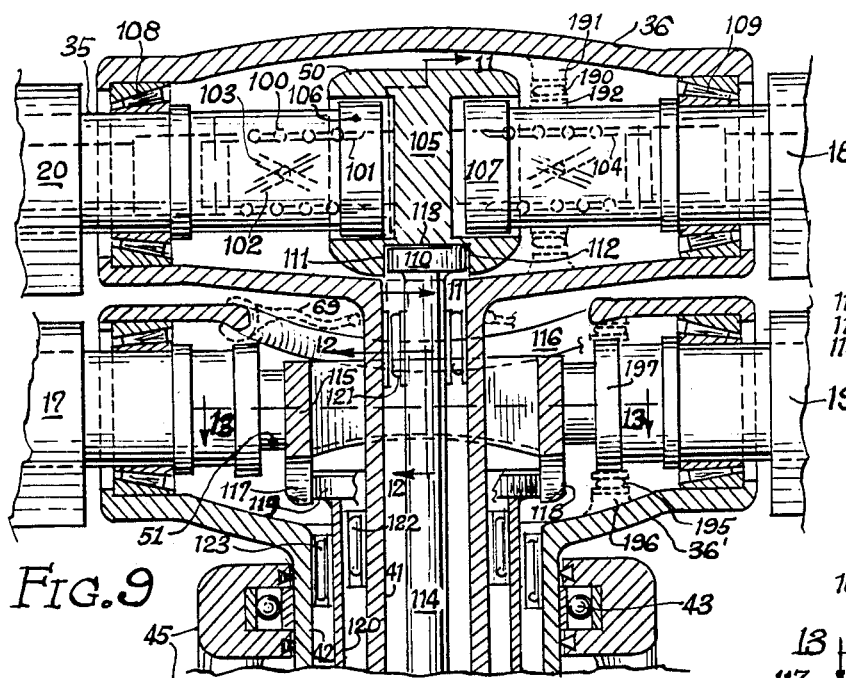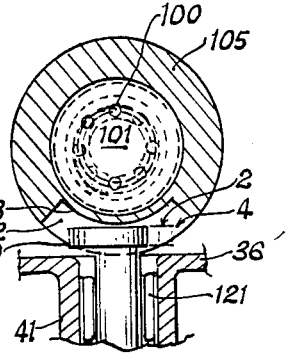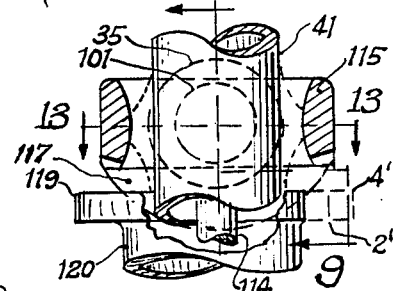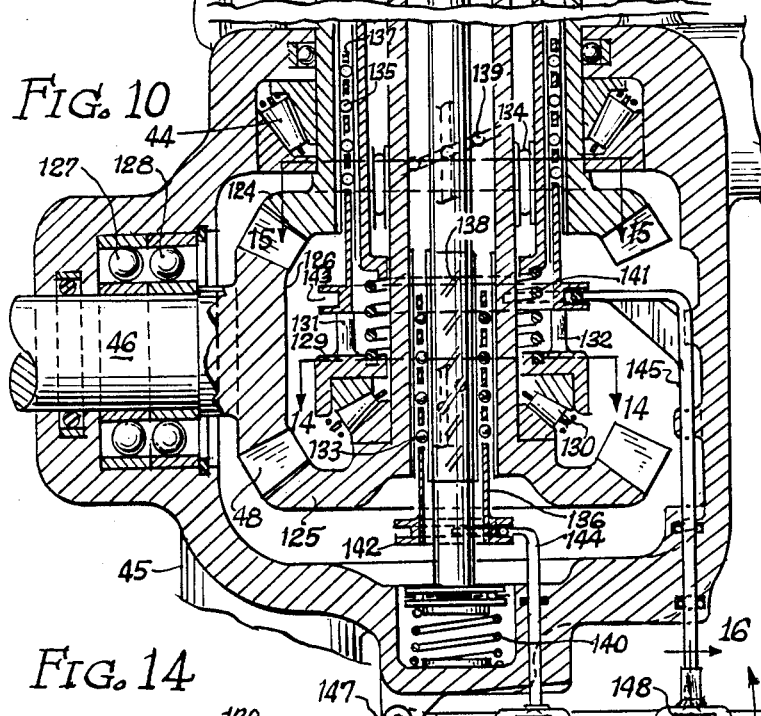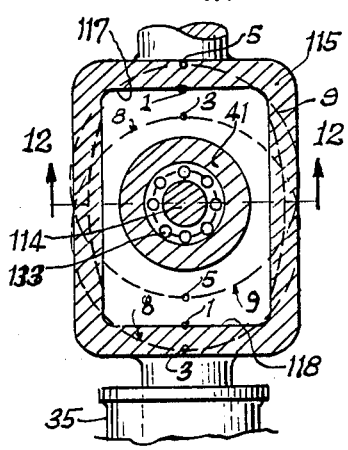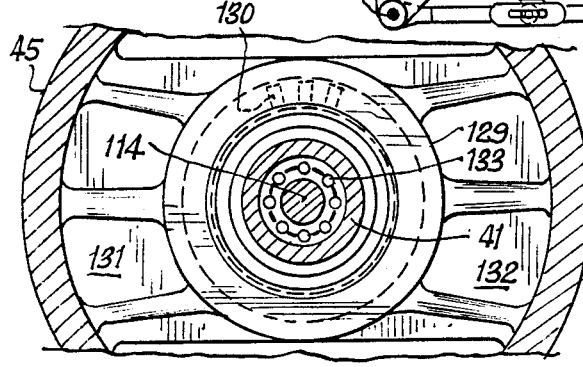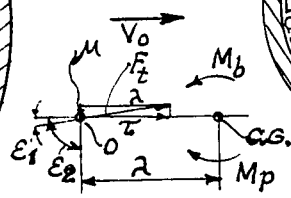

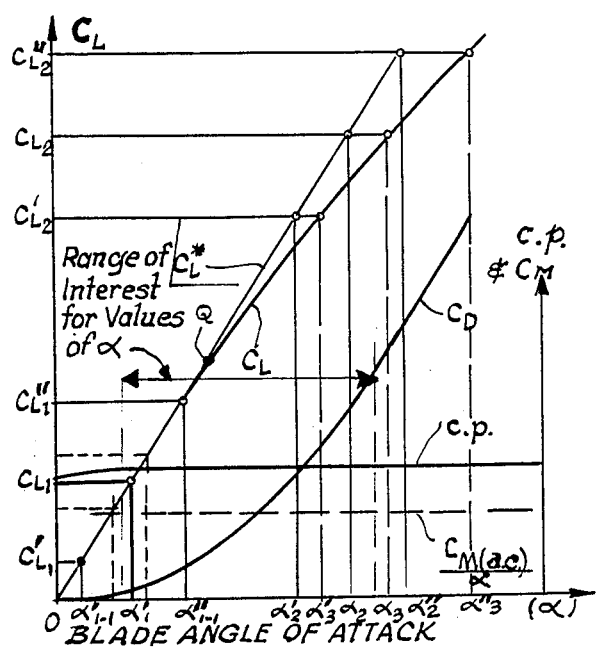
FIG. 20
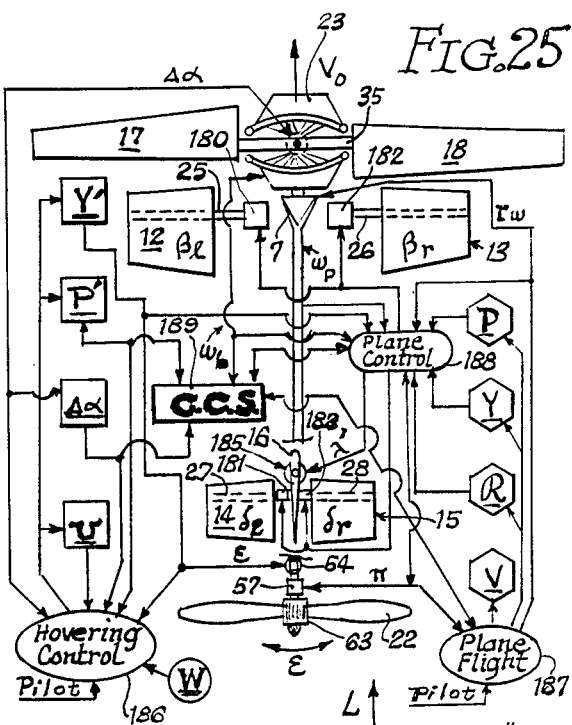
FIG. 25
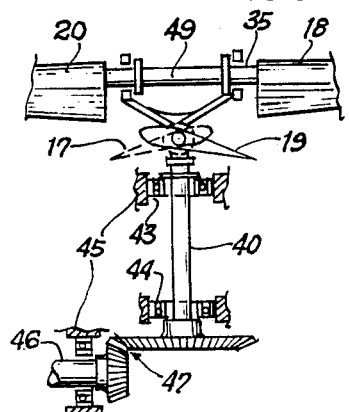
FIG. 5
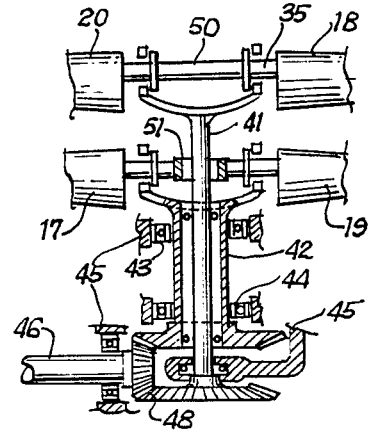
FIG. 6
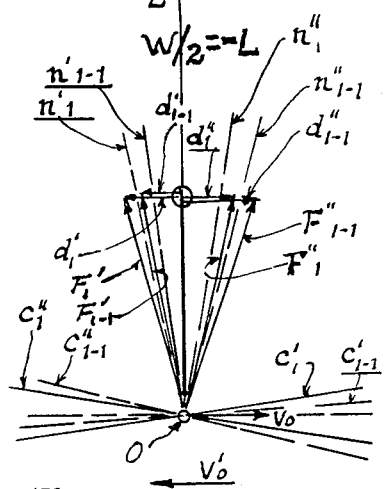
FIG. 23
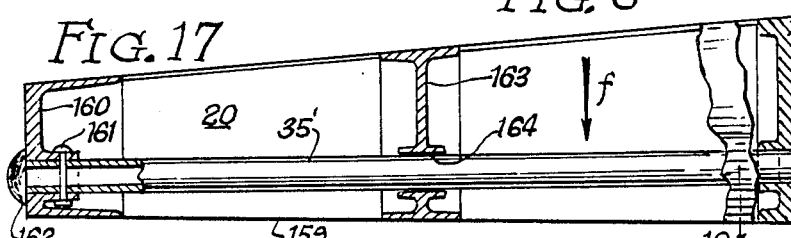
FIG. 17
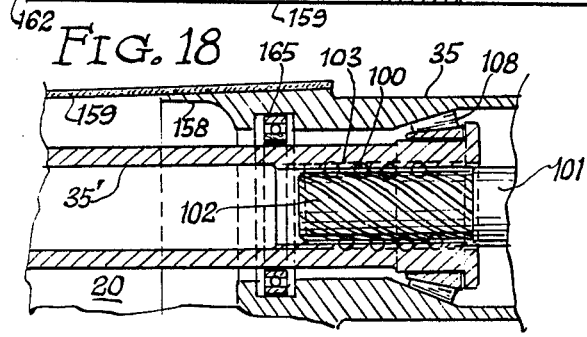
FIG. 18
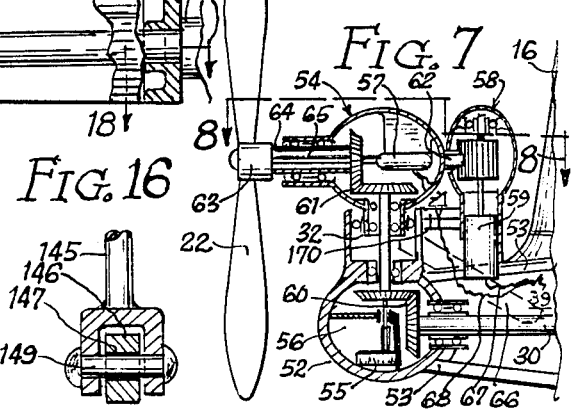
FIG. 16
FIG. 7

HELIPLANE

REFERENCE TO RELATED APPLICATION

This application is a continuation-in-part of my prior U.S. patent application Ser. No. 593,085 filed Mar. 26, 1984 and now abandoned in favor of this application.

BACKGROUND OF THE INVENTION

Ever since man realized that he could fly by means of hardware attached to him or surrounding him, he has attempted to combine the two basic elements of flying: lifting himself up in the air and moving around, once up in the air. To achieve these two basic steps, power must also be provided by or to such hardware. Two major generic types of such hardware have evolved during the past century, on a large scale: airplanes and helicopters. During the second half of this century, attempts were made to combine the two basic features of these two main types of aircrafts: VTOL (Vertical Take Off & Landing) airplanes. The basic attempts involved such approaches as: (1) rotating the propulsive means upward, (2) deflecting the propulsion means airstream downward, and (3) providing the craft with two separate sources for lifting power and forward thrust, one being best adapted to and for each one of these two types of operational modes.

None of these attempts has been very successful in the case of aircrafts powered by propellers. However, each basic type of crafts, airplanes and helicopters, has done very well on its own and is widely used for its best suited applications. Therefore, it seems natural to attempt to combine the favorable attributes of each type and to eliminate their disadvantages in an effort to provide lifting capability and speed in the same aircraft. Such a new type of aircraft is needed and considerable efforts are now being made worldwide to that effect.

SUMMARY OF THE INVENTION

In view of the background of flying crafts and of the need for new types with broadened capabilities, it is an object of the present invention to retain the advantages of both the airplane and the helicopter, and to embody them into one single new type of aircraft.

It is another object of the present invention to eliminate the various drawbacks and disadvantages of helicopters.

It is another object of the present invention to combine and marry the basic components, and their operations, of each type of aircraft in a manner such that said components can efficiently be utilized in the new aircraft for both basic modes of operation.

It is another object of the present invention to make the new aircraft easier and safer to operate then are either its two forebears.

Accordingly, the present invention provides a HELIPLANE (HELI[copter]-[air]PLANE) in which these three basic needs are met in one single craft: Easy and efficient hovering operation, efficient and fast flying capability, and simple and safe transient operation between hovering and normal forward flight. The major beneficial attributes of the airplane (propeller and lift-/control surfaces) are kept. The major beneficial attributes of the helicopter (gyrating blades and simple landing structure) are also kept. Eliminated are: (1) the need for the controlled and imposed cyclic pitch operation of the gyrating blades (cause of instability and complexity); (2) the need for any additional power source; (3) expensive and complex landing gears, and the resulting risks in craft landing; and (4) the need for landing facilities (cost saving and lower risks to others).

DESCRIPTION OF THE DRAWINGS

FIG. 1 is a top view of a basic Heliplane equipped with four gyrating blades.

FIG. 2 is a side elevation view of a basic Heliplane equipped with four gyrating blades.

FIG. 3 is a top view of the gyrating blades shown all gyrating in the same direction.

FIG. 4 is a top view of the gyrating blades shown counterrotating, in two pairs.

FIG. 5 is a partial side elevation view of the power drive of the gyrating blades shown in FIG. 4.

FIG. 6 is a partial side elevation view of the power drive of the counterrotating blades of FIG. 5.

FIG. 7 is a midsectional elevation view of the tail end propeller drive taken along line 7—7 of FIG. 8.

FIG. 8 is a partial top view of the tail end propeller arrangement and support.

FIG. 9 shows the upper portion of a detailed midsectional view of the power drive and control means of the gyrating and counterrotating blades.

FIG. 10 shows the lower portion of a detailed midsectional view of the power drive and control means of the gyrating and counterrotating blades.

FIG. 11 is a partial sectional view taken along line 11—11 of FIG. 9.

FIG. 12 is a partial sectional view taken along line 12—12 of FIGS. 9 and 13.

FIG. 13 is a partial sectional view taken along line 13—13 of FIGS. 9 and 12.

FIG. 14 is a partial sectional view taken along line 14—14 of FIG. 10.

FIG. 15 is a partial sectional view taken along line 15—15 of FIG. 10.

FIG. 16 is a partial sectional view taken along line 16—16 of FIG. 10.

FIG. 17 is a midsectional plan view of a twistable gyrating blade.

FIG. 18 is a partial detailed sectional view taken along line 18—18 of FIG. 17.

FIG. 19 is a diagram showing the velocity vectors and the aerodynamic forces applied at the tip and the root of two opposite gyrating blades.

FIG. 20 is a diagram showing the aerodynamic characteristics of a typical blade profile, plotted as a function of the blade profile angle of attack.

FIG. 21 is a diagram showing the aerodynamic forces acting on a typical blade profile and their spatial relationship with said profile and where they are applied.

FIG. 22 is a diagram showing the gyrating blade tip and root angles of attack, and their variations, for two opposite gyrating blades, in each pair of blades.

FIG. 23 is a diagram showing the aerodynamic forces acting on the profiles of two opposite gyrating blades.

FIG. 24 is a diagram showing the control forces and moments exerted on the Heliplane by the tail propeller.

FIG. 25 is a block diagram showing the relationships and interactions between the Heliplane controls, the pilot's input, the craft response and the major aircraft components.

DETAILED DESCRIPTION OF THE INVENTION

Referring to FIGS. 1 and 2 of the drawings, the heliplane generally comprises a fuselage 10 equipped with wings 12 and 13, stabilizers 14 and 15, vertical fin 16, a set of horizontal blades 17, 18, 19 and 20, a rear propeller 22 and landing structure 24. For ease of description and understanding, wings 12 and 13, stabilizers 14 and 15 and vertical fin 16 are shown articulated around their axes of rotation 25, 26, 27, 28 and 29 respectively, so that ailerons, elevators and rudder need not be shown, although a conventional airplane configuration can just as easily be used for the operation of the present invention in the airplane mode. A power plant 23 is used to drive all blades (17, 18, 19 and 20) and propeller 22 by means of horizontal shaft 30. The torque exerted by shaft 30 is transmitted to swivelling gearbox assembly 32. The torque needed to propel the horizontal blades is transmitted from the power plant 23 to the blades by vertical shaft assembly 34. Each horizontal blade is connected to shaft assembly 34 by a horizontal axle such as 35. The area covered by these blades is shown by phantom circular lines 31 of diameter $D_1$. The mechanisms used to connect the horizontal blade axles to vertical shaft 34 are located inside housing 36.

The heliplane fuselage includes a compartment 37, shown shaded for easy identification, for fuel, cargo and passengers, a forward compartment 38 for crew and passengers, a tail section 39. The tail section is elevated so that, on the ground, enough angular clearance $\gamma$ is provided to insure proper protection of propeller 22 blades. Blades 17, 18, 19 and 20 can either rotate all in the same direction as shown in FIG. 3 or be arranged to rotate, two in one direction and two in the opposite direction, as shown in FIG. 4 (contrarotating blade). In the configuration of FIG. 3, all blades are driven by a common shaft 40 as shown in FIG. 5. Contrarotating blades are driven by two concentric shafts 41 and 42 as ilustrated in FIG. 6. In this configuration, the torques exerted on the airframe by the rotation of each pair of blades cancel out and no other balancing torque is theoretically required. For the blade drive configuration shown in FIGS. 3 and 5, the torque applied on shaft 40 must be balanced by another torque of opposite direction and exerted directly on the airframe. This is achieved by the swivelling of propeller 22 in the direction of arrows f and f' of FIG. 1. The lateral component of propeller 22 propulsive force provides the balancing torque needed. In both blade configurations of FIGS. 5 and 6, the vertical shafts are supported by bearings 43 and 44 mounted on airframe structure 45. Drive shaft 46 supplies the power which is transmitted by gear assemblies 47 and 48. Each pair of horizontal blades is mounted on and affixed to a common axle assembly 49 for FIG. 5 and axle assemblies 50 and 51 for FIG. 6.

Referring to FIGS. 7 and 8, the tail end propeller operating means include a lower gearbox 52 solidly mounted on airframe structure 53, an upper gearbox 54 which can swivel inside the fixed structure 32, an oil pump 55 located inside an oil sump 56, a propeller pitch actuator 57, a gearbox 58 intended to provide the swivelling action required by propeller 22 and a motor 59 for the powering of gearbox 58. Gear trains 60, 61 and 62 transmit the power required to drive propeller 22 and to control its lateral orientation. Propeller 22 blade pitch actuating means are contained in hub 63 which is driven by outer shaft 64 and which contains inner concentric shaft 65 that connects actuator 57 to the propeller blade pitch actuating means. This whole power assembly is braced to tail section 39 structure 53 by two lateral struts such as 66 which connect gearbox body 32 to the airframe structure. Electrical leads 67 and 68 supply the signals needed to power and control motor 59 and actuator 57 respectively.

FIGS. 9 to 16 show a contrarotating blade assembly, similar to that which is shown in FIGS. 4 and 6. It is powered, controlled and operated so that its cyclic pitch can be automatically adjusted, once set at a desired value. The basic components shown and called out in FIGS. 4 and 6 need no further description. Because of the length of shafts 41 and 42, FIG. 10 shows the bottom part of FIG. 6, with the middle part of shafts 41 and 42 being omitted. The means used to set the amount of cyclic pitch and to make it adjust automatically as the blades gyrate around their power shafts are the same for all four blades and each pair of blades. Therefore, only one typical system needs be described in detail. All blade axles such as 35 are attached solidly to a blade such as 20. The inside of the right end of axle 35 is hollow and contains a ball-and-cage assembly 100 free to ride between axle 35 inner surface and shank 101 outer surface, but restrained by helically cut grooves such as 102 and 103 which are located on the surfaces of axle 35 and shank 101 just mentioned. Grooves 101 and 103 are inclined at an inverse pitch angle so that an axial motion of shank 101 causes axle 35 to rotate. The angle of blade 18 and shank 104 also have such helically cut grooves, but wound at a pitch angle inverse of that of shank 101, so that a motion of shanks 101 and 104 in the same direction creates an inverse rotation of blades 18 and 20. Both shanks 101 and 104 are in line and part of axle assembly 50 center body 105 which has both sides hollowed out to contain and guide journaled bearings 106 and 107 that are both part of the blade axles 35. Axles 35 are thus laterally well guided and maintained axially by thrust bearings 108 and 109 which resist the centrifugal forces exerted by the blades because of their gyration. The lateral sliding motion of axle assembly 50 is controlled by eccentric cam 110 mounted between walls 111 and 112 of groove 113 which is cut in the bottom part of center body 105. Eccentric cam 110 is canterlevered at the end of control shaft 114. Shaft 41 supports and drive housing 36 which structurally holds both blades 18 and 20 in place.

Blades 17 and 19 are similarly actuated, but the center body 115 of axle assembly 51 is hollowed out to allow the passage of shaft 41 and the oscillating motion of axle assembly 51. The top part of housing 36' is also hollowed out for the same reasons. A flexible membrane 69, not shown in its entirety and in phantom lines for the sake of clarity, forms a seal on shaft 41 and is held by the reinforced lip 116 of the opening. Center body 115 is equipped with two lips 117 and 118 which contain eccentric cam 119 solidly mounted at the end of control sleeve 120. Needle bearings 121, 122 and 123 center and laterally support control shaft 114, power shaft 41, control sleeve 120 inside power shaft 42. Power shaft 42 is then supported by structure 45 which houses bearing 43.

Each pair of opposite blades such as 17 and 19, and 18 and 20, thus have and share a common horizontal pitch axis, one for each pair of blades. They behave and respond as though they were mounted on a common solid shaft which is supported by bearings such as 108 and 109 for blade pair 18-20 for instance. However, the quasi solid assembly formed by blades 18 and 20, and center body 105, is allowed a limited free rotation about the horizontal pitch axis imposed by bearings 108 and 109 on said assembly. Eccentric cam 110 is circular and its diameter is equal to the distance separating walls 111 and 112. Thus, for any given angular position of cam 110, the blade pair assembly is free to oscillate between the boundaries of walls 111 and 112 shown in FIG. 11 as the left and right limits of wall 112. The angle formed by these two limits is large enough to accommodate the maximum oscillating amplitudes ever needed of the blade pair assembly. The same description applies to the assembly of blade-pair 17-19 and shaped center body 115. The drawings of FIGS. 12 and 13 indicate how that assembly can oscillate freely for any given position of circular eccentric cam 119 within a limited angular displacement while the internal walls of the two lips 117 and 118 are free to slide against their contact lines with cam 119.

When cams 110 and 119 are caused to rotate around their vertical axis of rotation, walls 111 and 112, and lips 117 and 118, respectively, are forced to slide sideways. Such an action causes the cooperating helically-grooved shanks such as 101 and 104 to slide accordingly. The orientation of helical grooves 102 and 103 is such that this lateral sliding of the assembly causes one blade to rotate one way whereas the opposite blade rotates in the opposite direction, thus increasing or decreasing the pitch angle made previously by one blade with respect to that which was made by the opposite blade, depending on the relative orientation of grooves 102 and 103. However, it must be emphasized that such variation of angle between two opposite blades does not affect and is not affected by the limited free rotation previously mentioned. Forces external to the system just described must be imposed onto the blades to change the angular position of either blade pair assembly about its horizontal pitch axis. However, when this happens, the angular position assumed by one blade of either pair does not change with respect to that which characterizes the other blade of that pair. Thus, one may say that the angular position of a blade-pair assembly is solely determined by forces and/or torques externally applied onto the blades in that pair, and balanced therebetween.

When blades 17, 18, 19 and 20 gyrate, they are subjected to two main forces: (1) centrifugal forces, which tend to keep the blades straight and which are resisted by thrust bearings such as 108; and (2) lifting forces, which are needed to lift the craft, but which create moments that the thrust bearings cannot realistically fully resist. The residual lateral forces induced by such moments should not be applied to actuating shanks such as 101 or journals such as 106, which are not even shown in FIG. 9, for actuating shanks of blades 17 and 19. In FIG. 9, shown in phantom lines, in the case of the actuating shanks of blades 18 and 19, means are introduced to indicate how the blade axles 35 can be supported, so that the actuating shanks are not subjected to lateral loads. Bearings such as 190 and 195, one for each blade articulation, are located inside bosses 191 and 196 which are part of housings 36 and 36' respectively. These bearings are mounted on lands 192 and 197 which then assume the role of journal bearings, such as 107. Housings 36 and 36' can easily be made strong enough to handle the lateral loads mentioned earlier in this paragraph.

Shaft 42 is driven by bevel gear 124, shaft 41 is driven by bevel gear 125 and both are driven by power drive bevel gear 126, but in opposite directions, which provides the contrarotating motion needed for blades 17-19 and 18-20. Drive shaft 46 is supported by structure 45 by means of bearings 127 and 128. It supplies the torque required to drive gear 126. The axial lift force exerted on shaft 41 is resisted by structure 129 which houses thrust bearing 130 and is connected to main structure 45 by a pair of reinforcing webs. These are not fully shown in FIG. 10, but they are well depicted in FIG. 14. In FIG. 10, the bottom ends of control shaft 114, power shaft 41 and control sleeve 120 are shown centered and laterally guided by sliding bearing 133, needle bearing 134 and another sliding bearing 135, all located inside of and held by the center bore of hollow power shaft 42. The balls of bearings 133 and 135 are held by structural cages 136 and 137 respectively, they ride in grooves 138 and 139 helically cut on control shaft 114 and control sleeve 120 respectively. These balls also ride in corresponding grooves axially cut on the internal surfaces of power shafts 41 and 42. Springs 140 and 141 counteract any forces exerted axially downward on control shaft 114 and control sleeve 120 respectively, so that cams 110 and 119 always stay engaged in grooves 113 and between lips 117 and 118 respectively. At their bottom ends, control shaft 114 and control sleeve 120 are equipped with grooved circular collars 142 and 143. Semi-annular forks fit the grooves of these collars. These forks are attached to rods 144 and 145 so that control lever 146, articulated on axle 147 attached to structure 45, can synchronously actuate control shaft 114 and control sleeve 120 in a singular and direct way. A typical connection between rod 145 and lever 146 is depicted in FIG. 16. An eyelid opening such as 148 allows axle 149 lateral clearance to prevent the exertion of lateral loads on rods 144 and 145 as lever 146 oscillates.

In the configuration shown in FIG. 9, the parts of axles 35 which are located inside blades 17, 18, 19 and 20 extend the full length of the blades, or the blades themselves have enough torsional rigidity to maintain the correct blade twist as the blades gyrate. Another approach is to make the blade torsional rigidity minimal and to maximize the central axle 35 torsional rigidity. In this instance, the tip of the blade can be twisted by axle 35 by rotating it with respect to the hub which remains fixed as illustrated in FIGS. 17 and 18, where a typical twistable blade is shown. The axle 35 is part of housing 36 and shank 101 actuates inner axle 35' which extends to end spar 160 at the tip of blade 20. Hub spar 158 is part of and solid with hub axle 35, which makes blades such as 18 and 20 solidly attached to each other.

The skin 159 of blade 20 is not very rigid and is kept taut by axle 35' which is always kept under compression so as to maintain longitudinal tension on skin 159. Axle 35' is attached to end spar 160 by stop button 162 and bolt 161. Skin 159 is kept properly shaped by a plurality of intermediate spars such as 163 through which axle 35' is guided by a plurality of journal bearings such as 164. Axle 35' is held and rotationally guided by thrust bearing 108 and ball bearing 165.

DISCUSSION AND OPERATION

The pitch angle or angle of attack of helicopter blades varies as the amount of lift required varies and also during each blade gyration to correct for the influence of the helicopter forward velocity. FIG. 19 represents two opposite blade profiles taken at equal radii $R_1$ and $R_2$ (stations $A_1$ and $A_2$) of FIG. 1 for blades 17 and 19. Assuming that a helicopter or a heliplane flies horizontally forward at a constant velocity $V_o$, at stations $A_1$ and $A_2$ along both blades, the angle of attack of each blade profile and the velocity diagrams relative to these profiles are as illustrated in FIG. 19. Without adjustment of the blade profile angle as the blade gyrates, the two symmetrical solid line profiles 1l and 1r would have a relative velocity $V_1'$ and $V_1''$ respectively with respect to the ambient air which is moving at a velocity $V_o$ with respect to the blades. If $v_1'$ and $v_1''$ are the profiles velocities with respect to the helicopter, one has: $V_1' = v_1' + V_o$ and $V_1'' = v_1'' + V_o$ with $v_1' = -v_1''$. Because the two blade profiles are mirror images of each other with respect to the vertical axis passing through center $O_1$, in terms of aerodynamic effects, one effectively has:

$$V_1' = v_1' + V_o \text{ and } V_1'' = v_1'' - V_o$$

with $v_1'$ and $V_o$ being in the same direction and $v_1''$ being in opposite direction. The net result is that $|V_1''|$ is much lower than $|V_1'|$ and the lift provided by profile 1l is much greater than the lift provided by profile 1r, along a line perpendicular to the helicopter axis. If that were so, the helicopter would bank to the right. To obviate this, but in order to provide the same total lift, profile 1l must reduce its angle of attack $\alpha_1'$ and profile 1r must increase its angle of attack $\alpha_1''$. These angles become respectively $\alpha_{1-1}'$ and $\alpha_{1-1}''$. Both profiles assume the positions depicted in phantom lines 1l' and 1r'. The velocity diagrams have not changed and $V_{1-1}'' = V_1''$, and $V_{1-1}''' = V_1'$, but the lift coefficient $C_{L1}''$ of profile 1r'is much larger than the lift coefficient $C_{L1}'$ of profile 1l'. $C_{L1}$ shown in FIG. 20 is the lift coefficient that corresponds to angle $\alpha_1'$, assuming that the curve $C_L$ represents the variation of lift coefficient with angle of attack for that airfoil profile. The lifts of both blades 17 and 19 are thus equal and no rolling torque is exerted on the helicopter. The mean angle of attack $\alpha_1'$ is called the collective pitch and the variation $\alpha_{1-1}'' - \alpha_{1-1}'$ is called the cyclic pitch, because it varies cyclically during each blade gyration. One can see that the amount of cyclic pitch must vary with the helicopter forward velocity and that a special mechanism must be provided to coordinate the blade cyclic pitch during each and every blade gyration. In the present invention, the heliplane, the cyclic pitch is fixed and its adjustment is automatic, because each opposite blade in a pair (17-19 and 18-20 for instance) of blades is solidly connected torsionally to the other and both rotate together the same angular amount around axle 35 axis. They can, and must, freely rotate, so that each profile, such as 1l and 1r, automatically assumes the angles of attack $\alpha_{1-1}'$ and $\alpha_{1-1}''$ required, without the need of intervention or action on the part of the pilot. This can be achieved if and when the aerodynamic moments which act on each blades 17 and 19 (or on any blade of a pair of blades that assumes that position) are equal, but of opposite sign. Three typical characteristics of airfoils need be introduced at this juncture: the aerodynamic center (a.c.) and its location for a given airfoil profile along the profile chord and around which the aerodynamic moment exerted on the airfoil is usually defined, the center of pressure (c.p.) where the resultant of all aerodynamic forces acting on the airfoil is applied and the aerodynamic moment around a pivot point (arbitrarily chosen at one quarter of the profile chord length, from the leading edge of the airfoil, if it is to coincide with the aerodynamic center a.c.) for the airfoil and located close to the profile chord. To render the airfoil stable, whereby the aerodynamic moment tends to make the profile rotate in a direction such as to decrease the angle of attack, the center of pressure is always located aft of the aerodynamic center. This means that a "free" airfoil so mounted on a body moving in still air will "trail" and align its chord in the direction of the airfoil motion. For a typical airfoil profile such as any of those which are of interest for application to the present invention, the location of the center of pressure remains quasi fixed for any angle of attack within the range of values of interest in this application. The normalized aerodynamic moment coefficient $C_M/\alpha$ also remains almost constant in that range of values for the angle of attack $\alpha$.

As mentioned in the previous section, two opposite blades of a pair are free to orient themselves in unison in response to forces and/or torques externally applied onto said blades so as to provide a limited balancing out of these forces and/or torques by means of the center body which connects these blades in a pair. In the context of FIG. 19, this may be translated as follows: the set of blade profiles $1_l$ and $1_r$ forming twice the value of a fixed collective pitch angle conserves that angle as the blade pair corresponding to that profile set oscillates so as to occupy the position shown in phantom lines for the set of profiles $1_l'$-$1_r'$. However, because this oscillation (or limited rotation) of the blade profile set was caused by the balancing action which the blades were forced to take so as to reach a position for which the resultant torque exerted by their central body on surrounding structures had to be nil, it may be stated that the blade assembly responded solely to the aerodynamic forces and torques resulting therefrom. In addition, the angular position variations between profiles $1_l$ and $1_l'$ on the left, and profiles $1_r$ and $1_r'$ on the right represent the changes in angle of attack of these profiles. But the blades move together as one single body, thus this variation in profile angular position is caused solely because of the torque balancing which always takes place continuously and automatically as the blade gyrates or as the blade rotors rotate around their substantially vertical axes. This concurrent variations of blade profile orientations (or angles of attack) in a blade pair are caused by the action of the airstream on the blades created by the forward speed of the aircraft (HELIPLANE) and constitute the cyclic pitch which characterizes helicopter operations.

However, the major and essential distinction between a HELIPLANE operation and that of a helicopter is that the cyclic pitch of helicopter blades indirectly generates the forward-directed thrust which causes the helicopter to move forward, whereas, the cyclic pitch of a HELIPLANE rotor blades is generated in response solely to airstream forces acting thereon. The forward speed of the craft thus causes the blade cyclic pitch to self-adjust to comply to those externally applied aerodynamic forces. The collective pitch selectively imposed by pilot control is the average between the minimum and maximum amplitudes reached by the cyclic pitch. During hovering, there is no cyclic pitch. During transitory flight (between hovering and forward flight), the cyclic pitch adjusts as required without pilot control.

FIG. 21, in which a typical airfoil profile $\phi$ is shown, illustrates how these parameters relate geometrically. Assuming that such an airfoil moves with a velocity $V_o' = -V_o$ with respect to that airfoil, the aerodynamic force R is applied at the center of pressure c.p.. This force R can be split into two components: the tangential force T parallel to the profile chord C and the normal force N perpendicular to C. No moment is developed around c.p., however, because the airfoil is mounted around an axis located at a.c., forward of c.p., for the practical reason of stability earlier mentioned, the force R can be considered applied at point a.c. just as well, provided that a moment $M_1$ exerted around point a.c. on the airfoil is introduced. This moment $M_1$ balances the effect that the translation of the component N by an amount q which is the distance between c.p. and a.c., has. If q hardly varies when the angle of attack $\alpha$ varies, $M_1$ then increases linearly and singularly with $\alpha$, within the range of interest of $\alpha$ values, for a given blade tip velocity. This is what FIG. 20 shows. The reason is that c.p. remains quasi fixed in that range of values of $\alpha$ and thereby within the range of $C_L$ of interest.

The airfoil profiles of interest for the present invention are those with a $C_L^*$ charateristics for which the lift coefficient varies linearly with $\alpha$. Practically, for large values of $\alpha$, the curve of $C_L$ starts deviating from the $C_L^*$ straight line that is ideal. This is discussed later when the effect of altitude on heliplane performance is analyzed. At low altitudes and under normal operating conditions, the quasi linear branch of $C_L$ versus $\alpha$ is used and is the only part of the curve considered for the present discussion. To determine the action of the forces developed by airfoils, after force R is translated to point a.c., which generates moment $M_1$, it is customary to resove R into two components that can be used directly in the analysis of the craft body dynamics: a vertical force $L_1$ or lift, and a horizontal force (usually in the flight direction) $D_1$ or drag. Drag is overcome by the torque exerted by the shaft that drives the blades. Lift provides the force that balances some of the heliplane weight in flight, but all of its weight when the heliplane hovers. Referring to FIG. 21, F is then equal to R and both have the same direction, but D is much larger than T and L is only slightly smaller than N. The aerodynamic moment M (or $M_1$) is then equal to $q \times N$ and tends to decrease $\alpha$ for any value of $\alpha$ of interest here. $\alpha$ varies from the hub to the tip of the blades. FIG. 22 illustrates how the blade airfoil hub and tip profiles appear relatively positioned if the heliplane is viewed from the tip of blade 17 in FIG. 1, when the heliplane hovers or flies forward at a very low velocity $V_o$. The subscripts h refer to the blade hub and the subscripts t refer to the blade tip. The superscripts ' refer to the left blade 17 and the superscripts " refer to the right blade 19. The angles of attack of the hub profiles and of the tip profiles differ because the velocities of the hub profile leading edges are lower. The amount of lift contributed by each blade is minimum at the hub and maximum at the blade tip, although the profile chord is shown longer near the hub. The total lift corresponds to four times (4 blades) the lift of each blade, integrated from hub to tip. However, the total lift can be normalized at distances $R_1$ and $R_2$ for a unit length section of each blade, as shown in FIG. 1. Such a normalized value is used for illustration purpose in FIGS. 19 and 23 in which W, that represents the heliplane total loded weight, is shown related to lift as being $-2L$, if L is the lift provided by all blades, for each half of the disk $\Delta$ area of diameter $D_1$ (inside circle 31) as shown in phantom line in FIG. 1. In FIG. 19, where the lift forces are shown normalized for a pair of opposite blades, W/2 must be balanced by lift L. By convention, L is vertical and its components contributed by each blade must be inclined at an angle such and have values such that, when combined, their resultant is vertically in line with the power shafts. Because both bades of each pair of blades are solidly connected and allowed to rotate freely together, the aerodynamic moments $M_{1-1}'$ and $M_{1-1}''$ exerted on each blade of any pair are always equal. These moments are equal to:

$$M_{1-1}' = C_M' \cdot K \cdot (V_{1-1}')^2 \text{ and } M_{1-1}'' = C_M'' \cdot K \cdot (V_{1-1}'')^2$$

where K is a constant depending upon air density and blade configuration. Whenever $V_o$ is appreciable, $(V_{1-1}')^2$ and $(V_{1-1}'')^2$ are considerably different and $M_{1-1}'$ would be much larger than $M_{1-1}''$ if $\alpha$ for each blade were not allowed to adjust accordingly. If the blade $\alpha$'s are not correct, $M_1'$ being larger than $M_1''$, the two blades rotate clockwise to bring $\alpha_1'$ down to the value of $\alpha_{1-1}'$, thereby increasing $\alpha_1''$ to the value of $\alpha_{1-1}''$, which results in $F_1'$ tilting to the $F_{1-1}'$ position and $F_1''$ tilting to the $F_{1-1}''$ position, as $V_o$ varies from 0 to the value indicated by FIG. 19, at which time $M_{1-1}'$ equals $M_{1-1}''$. With the proper combination of blade airfoil profiles and blade twisting between the hub and the tip of a blade, the cyclic variation of $\Delta\alpha_1$, during each blade gyration, can be made to vary in the same ratio for both $C_M$ and $C_L$, so that very little or no correction is needed, within the range of $V_o$ of interest. Any resulting rolling moment that could be induced by a variation of $V_o$ is thereby automatically compensated and avoided. Chords $C_1'$ and $C_1''$ of the two blade airfoil profiles then assume the positions of chords $C_{1-1}'$ and $C_{1-1}''$ respectively as the heliplane then accelerates forward from rest to velocity $V_o$. It should be noticed that: (1) the induced cyclic pitch of the heliplane does not contribute to the propulsion forward of the craft, and (2) consequently, the neutral axis of the cyclic pitch is the same as the direction of $V_o$. This means that the blades, when parallel to the craft longitudinal axis, have the same angle of attack and that disk $\Delta$ needs not tilt in order to generate the craft propulsive force. The craft propulsive force is provided exclusively by the tail propeller, in the case of a heliplane.

Referring now to FIG. 23, where the airfoil profiles have been omitted for the sake of clarity, the normals $n_1'$, $n_{1-1}'$, $n_1''$ and $n_{1-1}''$ to chords $C_1'$, $C_{1-1}'$, $C_1''$ and $C_{1-1}''$ are shown for ease of understanding. Aerodynamic forces $F_1'$, $F_{1-1}'$, $F_1''$ and $F_{1-1}''$ are shown tilted back from the normal lines with respect to the motion direction of their respective profiles which are represented only by their respective chords. The blade drags $d_1'$, $d_{1-1}'$, $d_1''$ and $d_{1-1}''$ are shown to indicate that a net resulting yawing moment is created, above and beyond the torque required to drive the blades. As explained later, this discrepancy is compensated by the tail end propeller or by the rudder fin. As $V_o$ increases from 0 to its maximum value, $d_1'$ decreases down to $d_{1-1}'$ and $d_1''$ increases to $d_{1-1}''$. The total drag force generated by the blades, however, does not change appreciably. The increase in the lift component of $F_1'$ to that of $F_{1-1}'$ is compensated by the decrease of the lift component of $F_1''$ down to that of $F_{1-1}''$. The net result, however, is a slight induced rolling moment. This can be compensated by a trim adjustment of wing-ailerons 12 and 13 as is discussed later. Both yawing and rolling amount corrections needed are of small magnitude and are more in the nature of a trim. For each pair of blades, the total lift generated is L and both pairs generate 2L or −W.

As the flight altitude increases and when the heliplane loading varies, separately or concurrently, L must be adjusted correspondingly. This can be achieved by increasing the rate of gyration of the blades and the mean angle of attack $\alpha$, again separately or concurrently. Assuming that engine rpm's cannot compensate effectively for the full range of variations of both altitude and weight, the need for an adjustment of $\alpha$ is obvious. The lifting force generated by the blades can be increased by increasing $C_L$. FIG. 20 shows how $C_{L1}$ can easily be increased two or threefold to the value $C_{L2}$ by increasing $\alpha_1'$ to $\alpha_2$. However, in such an instance, the curve $C_L$ versus $\alpha$ starts deviating from the straight line that exists up to point Q. The variations $\Delta\alpha$ of $\alpha$ between left side and right side for high values of velocity $V_o$ cease to be symmetrical, as a change from $C_{L2}$ to $C_{L2}''$ requires a variation $\alpha_3''-\alpha_3$ larger than $\alpha_3'-\alpha_3$, which corresponds to a change from $C_{L2}$ down to $C_{L2}'$ that is equal to $C_{L2}''-C_{L2}$, though. Had $C_L$ versus $\alpha$ been a straight line, the variation $\alpha_2-\alpha_2'$ would have been equal to $\alpha_2''-\alpha_2$. It should also be mentioned that, in that instance, $\alpha_2$ would have been smaller than $\alpha_3$. When all four blades gyrate in the same direction, these secondary effects of induced yaw and roll are additive, whereas, in the case of contrarotating blades, each blade disk $\Delta$ action cancels out the effect from the other disk $\Delta$ that pertains to the second pair of blades. Because all blades are driven by the same main drive shaft 46 and because all blades gyrate at the rate, whether in one direction or the other, the orthogonality of the blade axes is always maintained.

The operation of the heliplane blades of the configuration represented by FIGS. 1, 2, 3 and 5 is simple and self explanatory from the discussion above and the description of the means provided for driving the blades. The operation of the contrarotating heliplane blades of the configuration represented by FIGS. 4, 6, 9 and 10 is more complex. Because the means used to adjust the value of $\alpha$ (or $2\alpha$, if referring to the angle made by the chords of two opposite blades of either pair) can also be adapted to the first configuration, only the operation of the blade control means of the second configuration needs be discussed here. Referring to FIGS. 9 and 10, it is easy to see that, for a set fixed position of lever 146, the axial positions of both control shaft 114 and control sleeve 120 are fixed. Control shaft 114 rotates with power shaft 41 and control sleeve 120 rotates with power shaft 42, as though they were solidly connected. One set rotates in one direction and the other set rotates in the opposite direction. The positions of neither cam 110 nor cam 119, with respect to axle assemblies 50 and 51 respectively, change as the blades gyrate, one pair in one direction, the other pair in the opposite direction. Angle $2\alpha$ made by the chords of the airfoil profiles of both blades in a pair, therefore, remains fixed. For a given air density and a given craft weight, if the craft is hovering, the angle of attack of each blade remains constant and equal to $\alpha$, through any complete blade gyration (cases shown in FIGS. 9, 11, 12 and 13, in which both eccentric cams are shown in their neutral, or centered, positions). No cyclic pitch effect takes place and $\alpha$ corresponds to the collective pitch setting of the blades of a hovering helicopter. Assuming that the pilot causes the craft to accelerate forward to a velocity $V_o$, by means of the aft propeller, at constant altitude and without appreciable change in craft weight, both pair of blades automatically start oscillating around the axes of axles 35, one full oscillation for each full gyration, because, as explained earlier, the forward velocity $V_o$ creates alternating restoring moments on each blade as it gyrates. As long as shanks 101 and 104 do not move sideways, both blades 18 and 20 are locked and behave as one solid body. The same applies to blades 17 and 19, for the same reason. However, clearance must be provided in the direction perpendicular to the plane of FIG. 10, or in the plane of FIGS. 11 and 12, so that neither cam interferes with these oscillating movements. The lips 117 and 118 are open in the front and in the back as shown in FIG. 12, and cam 119 can cause no interference. In the case of cam 110, groove 113 extends around a circular segment, as shown in FIG. 11, and to an extent such that clearance is provided for any setting of cam 110 and any possible variation of angle $\alpha$.

Assuming that the craft altitude, or its weight, or its upward acceleration has increased appreciably from the start of the flight, and that larger variations of $\alpha$ around its mean value $\alpha_2$ are needed, which may even exceed the initial mean value $\alpha_1'$ that was required at takeoff, the value of $\alpha$ must be increased accordingly. To that effect, by pilot's action or automatically, lever 146 is pulled down, which, with the inclinations shown in FIGS. 9 and 10 for grooves 102, 104, 133 and 139, causes an increase of angle $2\alpha$ for both pair of blades, simultaneously and synchronously. The distances from rods 144 and 145 to articulation point 147, the inclinations of helical grooves 138 and 139, and the radii of control shaft 114 and of control sleeve 120 are all such that a given motion of lever 146 causes the same variation of angle $\alpha$ for each blade of any pair and in the same direction. Because of the opposite pitch of grooves 101 and 104, half a turn of cam 110, and of cam 119 for that matter, causes axle assemblies 50 and 51 to move from full left to full right. This corresponds to the full amount of $\alpha$ adjustment for all conditions of altitude, craft gross weight and maximum upward rate of acceleration under which the heliplane is supposed to operate satisfactorily. In FIGS. 11 and 12, cams 110 and 119 are shown in their neutral positions. Phantom lines 2 and 2' for FIGS. 11 and 12 indicate the extreme left or extreme right positions of these cams. Phantom lines 4 and 4' indicate the other neutral positions that cams 110 and 119 could assume if the other half turn were used. In FIG. 13, the contact points 1 with lips 17 and 19 correspond to cam 119 being in a neutral position. Contact points 3 correspond to cam 119 (shown in phantom line circle) having pushed lip 118 to its extreme right position. Contact points 5 correspond to cam 119 having pushed lip 117 to its extreme left position.

Blades 17, 18, 19 and 20 have so far been assumed to have high torsional strength and not be easily twisted. They move, or at least rotate, as a solid non-deformable body. Practically, such an assumption is unrealistic and blades do twist and bend. These deformations are taken into account in the design of the blades and of their pitch control system, either directly or indirectly, depending upon the flight control approach used. One alternate design is to make the blade twistable, but in a controlled and programmed fashion. Such blades have a skin made of plastic materials reinforced with high strength fibers or filaments that have a high modulus of elasticity. When such fibers are laid in the general direction of the blade axis to form the blade skin, the result is a lighter stronger blade, less prone to fatigue-type failures. The blade is more rigid in the direction of arrow f of FIG. 17 and in the direction perpendicular to arrow f and to the plane of FIG. 17. However, the skin of such blades has a very low torsional rigidity, or low shear modulus around the axis of axle 35', if so desired. Such characteristics can usefully be exploited to control the blade angle angle of attack by adjusting the degree of blade twisting between the hub and the tip. The equivalent effective angle of attack of the blade is then the angle of attack at the hub plus the mean effective twist angle of the blade. This is done by means of axle 35, housing 36 and hub spar 158 being made one single solid body. The rotational motion of shank 101 is then imparted directly to the tip of the blade, while the hub is kept fixed. At this juncture, it should be pointed out that most of the lift force developed by the blade is generated by its outermost one third portion. The tapering of the blades, thickness and span wise, from hub to tip, also contributes appreciably to making the larger part of the total blade twist take place in the outermost one half of the blade length. However, the blade must twist, not in response to the external aerodynamic forces exerted on it, but only in response to the torque applied internally by the blade twist control means. Such internal torque is transmitted to the blade skin by central shaft 35' and its attachments to the blade structures which are quite rigid. Shaft 35' could be made of beryllium alloys, for instance, which exhibit high shear modulii of elasticity and are also very light. For a given weight, the stiffness of such a hollow shaft can be maximized this way. Except for the changes in design shown in FIGS. 17 and 18 as compared to FIG. 9, all other design features and operational characteristics remain the same. A heliplane equipped with twistable blades operates and functions as was previously described and discussed. The blade twisting is used exclusively for varying the value of $\alpha$ around its mean value already determined by the hub section angle of attack and the "natural" built-in degree of twist given to the blade. This built-in twist is that which the blade naturally assumes when central shaft 35' transmits no torque to end spar 160. This condition could be defined as that which corresponds to the craft hovering at sea level, under normal weight and engine rpm take-off circumstances (no cyclical variation of $\alpha$ needed).

Although already mentioned, it should be reiterated here that blades 17, 18, 19 and 20 do not contribute to the craft forward propulsion, or sideways propulsion for that matter as none is expected from a heliplane. This is a generic trait of this type of craft, because the cyclic path is freely induced and is the result only of the aerodynamic forces and moments imposed on the blades by the craft forward velocity which is the result of another independent and unrelated action on the craft. Such action is exclusively produced by the tail end propeller (which could just as easily be a front end propeller and located forward of the craft nose). The pitch control of the propeller can be of a standard nature and needs no further discussion. The driving of shaft 30 by power plant 23 needs no discussion, save for a gearbox 7 that may be needed between power plant 23 and shaft 30. This requirement may be mandatory for a heliplane because the regimes and modes of operation of propeller 22 do not necessarily correspond to those of the lift blades. A separate engine can be used for the operation of propeller 22, just as well, but this needs not be discussed further as being state of the art. Propeller 22 has three basic roles: (1) to provide the forward propulsive forces; (2) to provide the lateral force needed to balance the lift blade torque (except when blades are contrarotating); and (3) to provide the additional propulsive power required if and when extra lift forces are needed from wings 12 and 13, usually only when the craft forward velocity is appreciable. Such additional lift forces can be used to compensate for lifting deficiencies of the blades caused by conditions of high altitude, extra weight, etc. . . . This third role is discussed in more detail later. The operation of the tail end propeller discussed hereunder pertains to the first two roles.

For any operation mode, in the case of the heliplane configuration for which all blades gyrate unidirectionally, a torque "M" is developed. It is assumed to be exerted around a vertical axis that passes through the craft center of gravity CG of FIG. 24. This torque $M_b$ is balanced by a torque $M_p$ generated by the lateral component of the total force $F_t$ generated by propeller 22. In the hovering mode, no forward oriented component of $F_t$ is needed and the propeller axis must be orthogonal to the craft longitudinal axis. The propeller axis assumes the position of line X of FIG. 8, which makes an angle $\epsilon_2$ with the craft longitudinal axis. The force then developed $\mu$ is not large. The propeller can either rotate at low rpm's or have a very small blade pitch angle in this mode of operation. At the cruising velocity $V_o$ of the heliplane, the axial component $\tau$ of $F_t$, or forward thrust, is much larger than $\mu$ and angle $\epsilon_2$ becomes $\epsilon_1$ that is much smaller than $\epsilon_2$. To achieve this, propeller 22 and its driving assembly rotate around a vertical axis passing through point 0 of FIG. 24, where all the forces developed by the propeller are shown being applied. Point 0 corresponds to the projection of the axis of the vertical shaft of the intermediary spur gear train of FIG. 7, which connects gears 60 to 61, and which also corresponds to the vertical axis of rotation of gearbox 54. Torque $M_p = \mu \cdot \lambda$ is always equal to $M_b$ and $\lambda$ is the distance between point 0 and the craft CG. The aircraft never changes its forward velocity instantaneously, but goes through time periods of acceleration and deceleration. The rotation of propeller 22 assembly and the adjustment of its pitch angle $\pi$ (and rpm as the case demands) are conducted simultaneously as $V_o$ varies, as required and programmed. The monitoring of the: craft rate of forward acceleration (or deceleration), instantaneous craft forward velocity V, $\tau$, $\mu$, $\epsilon$, propeller rpm and pitch $\pi$ is achieved by means that are independent of the pilot's direct control, under normal operating conditions of the heliplane, as shown in FIG. 25 and as discussed later. These means insure that the relationship $M_p = M_b$ and $-\tau = D_t + a \cdot W/g$ are always satisfied, while the craft always moves in the direction selected by the pilot. $D_t$ is the total drag of the craft at any time, a is the acceleration needed to reach the selected velocity $V_o$, W is the instantaneous weight of the craft at that time, and g is the gravitational constant.

In the case of contrarotating blades, the force $\mu$ is not required, except for trim requirements. $M_b$ and $M_p$ become very small and the total amount of propeller 22 rotational displacement needed is also very small. This is represented by angle $\epsilon_o$ of FIG. 8. Regardless of the amount of such angular movement required for propeller 22, the assembly propeller 22/gearbox 54 is driven by a circular gear rack solidly affixed to gearbox 54 housing. The length of this gear rack depends upon the magnitude of angular displacement $\epsilon$ required by propeller 22. FIG. 8 illustrates the case where a full 90° range is needed. The gearing pinion driven by motor 59 sets propeller 22 angular position as monitored and directed by the flight control system outlined in FIG. 25. The housing of the rack and pinion assembly is solidly secured to the airframe 53, structure 32 and bracing struts 66 by three struts such as 170. A sliding seal located between rack housing 171 and gearbox 54 housing, and another circular seal located between gearbox 54 housing and structure 32, are not shown for the sake of simplicity. Housing 171 is affixed solidly to housing 58.

The heliplane takes off and lands vertically, therefore it needs no landing gear. However, on snow or on water, assuming that landing structure 24 were equipped with skis or floats, as needed, the heliplane can be propelled forward, without leaving the ground or the water. A certain amount of lift provided by blades 17, 18, 19 and 20 can reduce the craft apparent weight to facilitate the craft motion. Wheels can also be attached to the landing structure 24 such as 172, shown in phantom lines in FIG. 2, so that non-vertical short takeoffs can be made, when desirable.

When the heliplane is flying forward, aerodynamic forces and moments are generated by the surfaces of the wings, the stabilizer and vertical fin. As earlier mentioned, for the sake of clarity and simplicity, the wings, stabilizer and fin rotate in their entirety for the configuration shown in FIG. 1. The discussion hereinunder applies also to fixed wings with ailerons, fixed stabilizer with elevators and fixed tail fin with a rudder. Therefore wings, stabilizer and tail fin play the conventional roles that they have in a standard airplane. In addition, by being rotatable, they also play the roles of conventional components such as: ailerons, elevators and rudder. A heliplane can be built like a conventional airplane, look like one and still operate just as well as that which is presented herein as an example. Because the heliplane does not use cyclic pitch for propulsion, it does not have to tilt in a certain direction to induce the craft movement in that direction. Although the heliplane can fly at any forward velocity V without stalling, between 0 and its maximum velocity $V_{max}$, only two basic operation modes are discussed here: hovering and cruise velocity flight, the latter being referred to as flight hereafter. The functions of each basic system used to fly the heliplane are classified as Primary, Secondary and Tertiary. Primary refers to the vital and essential function performed by that system; Secondary refers to an assistance function performed by that system, not essential but very useful; Tertiary refers to a use made of the system either as an adjunct to the function of another system, or as means to compensate for incidental variations in craft characteristics and performance caused by changes imposed on other systems which results in undesirable side effects. The table presented on the following page indicates schematically the functions that the various systems perform and in which mode of operation and under what conditions. The information given in that table is that which a block diagram would give, but in a way easier to grasp at first glance (cf. FIG. 25).

HELIPLANE SYSTEM FUNCTIONS AND OPERATION
APPLICABLE MODE: * Hovering # Flight

| FUNCTION | Blades | Propeller | Wings | Stabilizer | Rudder or Vertical FIN |
|---|---|---|---|---|---|
| PRIMARY | | | | | |
| Lift | * # | | | | |
| Propulsion | | # | | | |
| Craft Direction | | * | | | |
| Craft Pitch | | | | # | |
| Craft Yaw | | | | | # |
| Craft Roll | | | #(0) | | |
| SECONDARY | | | | | |
| Lift | | | # | # | |
| Propulsion | # (1) | | | | |
| Craft Yaw | | * # | * | | # * |
| Craft Pitch | | * | | * # (1) | |
| TERTIARY | | | | | |
| Craft Weight | * # | | # | # | |
| Altitude | * # | | # | # | |
| Flight Acc.(4) | # (2) | # | | # (2) | |
| Climb Rate | * # | # (3) | # (3) | # (3) | |

REMARKS:
(0) Roll is obtained by rotating the wings in opposite directions, whereas an increase in lift results from an increase of the angle of attack of both wings, by the same amount, at the same time.
(1) The blades can contribute to the propulsion if the heliplane is pitched downward by means of the stabilizer.
(2) Because of (1) above, the blades can contribute to the craft forward acceleration with concurrent use of the stabilizer.
(3) The wings and the stabilizer can contribute somewhat to the rate of climb of the craft by being pitched upward to augment their lift contribution. The forward thrust developed by the propeller must then be increased to account for the increased drag.
(4) Flight acceleration refers to the craft forward acceleration; although forward and upward accelerations can occur concurrently and are not exclusive of each other.

In FIGS. 1 and 2, the points where the various forces acting on the heliplane major components are applied are identified by points $P_1$ and $P_2$ for each half of blade disk $\Delta$, points $P_1'$ and $P_2'$ for the wings, $q_1$ and $q_2$ for the stabilizer, and $q_3$ for the rudder fin. The aerodynamic force $r'$ acting on each wing in flight and applied at point $p_2'$ can be resolved into $1'$ and $d'$ which are the wing lift and drag contributions respectively. $2L$ is the total lift force, $D_t$ is the total drag and $\tau$ is the total thrust forward and which is equal to $D_t$ but applied in the opposite direction, under steady flight conditions. The points where the aerodynamic forces are applied on the flight control surfaces are all shown located behind their respective component axial articulation in order to give inherent stability to the operation of that component. The moments for pitch, yaw and roll motion of the craft are not shown because they are applied as they would be in an airplane. The lift blades exert no appreciable torque on the craft, except in the yaw direction. This torque is balanced by propeller 22 in the case of the configuration of the heliplane for which the blades are not contrarotating.

The block diagram shown in FIG. 25 illustrates how these components, their control systems and their functions interrelate and are coordinated. In addition to the components already mentioned, FIG. 25 introduces means such as: wing actuators 180 and 182, stabilizer actuators 181 and 183, rudder actuator 185. The angles of attack $\beta_l$ for the left wing, $\beta_r$ for the right wing, $\delta_l$ for the left stabilizer, $\delta_r$ for the right stabilizer and $\lambda'$ for the rudder fin are also introduced here. The propeller pitch is referred to as $\pi$, the blade gyration rate is $\omega_b$ and the propeller rotational speed is $\omega_p$. The power plant rpm is supposed to be the same as $\omega_b$ and the gear ratio of gearbox 7 is called $r_w$ and is equal to $\omega_b/\omega_p$.

The heliplane motions are controlled by the pilot directly by means of selecting: (1) the rate of climb or descent U, (2) the craft orientation Y', and (3) the craft attitude setting P', in the hovering mode, by means of hovering control system 186 which is under pilot's direct control. In the flight mode, the pilot also directly controls: (1) the craft forward velocity V, (2) the rates of roll R and yaw Y, and (3) the craft attitude setting or pitch angle P, by means of a plane flight system 187 connected to and operating in conjunction with a plane control system 188 which monitors the craft stability in the flight mode. The monitoring and coordinating of transient operational conditions between the hovering and flight modes, including the handling of the feedback interactions mentioned earlier between the craft various main components, are performed by means of a Coordinating Control System (C.C.S.) 189. The connecting lines between the various control systems and components indicate how they interrelate.

One example suffices to explain how the overall craft control operates. As mentioned above, the pilot can change the craft attitude (P'), for instance pitch it down to improve downward visibility for example, during hovering. Such a change of craft attitude induces a forward thrust component from the blades, in the hovering mode, and this would induce a forward motion of the craft, as it would in the case of a helicopter. However, in the case of the heliplane, the forward thrust can be balanced by a backward thrust generated by propeller 22, if its pitch $\pi$ is reversed. The air stream created by the propeller interacts with the stabilizer surfaces, which produce the moment needed to nose the craft down. The aerodynamic interaction of blades 17, 18, 19 and 20 with wings 12 and 13 can be used in a similar way when the wings are rotated to give their surfaces a quasi vertical position. Those are good reasons for articulating the stabilizer and even the wings and the vertical fin, instead of using elevators, rudder and ailerons. The electronic, electrical and computing systems required to monitor, control and perform such functions are state-of-the-art and need no further elaboration.

Another operation basic to the heliplane relies heavily on the use of the Coordinating Control System and could hardly be carried out routinely by any pilot without its assistance. This operation takes place at least twice every flight: Take Off and Landing. To minimize the interference of the wings below the gyrating blades, during hovering, with the blade-created downward airstream, the wings must be positioned vertically. In that position, as earlier mentioned, they can be used to generate moments on the craft that can be useful in controlling its dynamics. As the heliplane lifts itself above the ground, if ensuing forward flight is wanted, the propeller is caused to generate thrust. This results in an inclined force that gives the heliplane an acceleration directed forward and upward, if the vertical component of the inclined resultant force is greater than the heliplane gross weight, which must be if takeoff is desired. Slowly, the heliplane acquires a velocity that can be represented by a vector that shifts from the vertical position to a quasi-horizontal position when the heliplane has reached the altitude and the forward velocity selected by the pilot. At the same time that the velocity vector goes up, it remains tangent to the path followed by the heliplane C.G. on its way up and forward.

As this takes place, the Coordinating Control System continuously adjusts the wings and stabilizers in a manner such that their angles of attack remain within the range that maximizes their lift contribution, without stall being induced. Within a total angular variation of no more than a few degrees, the chord lines of the wings and of the stabilizers are maintained at an angle equal to approximately the angle made by the heliplane velocity vector with respect to the horizontal PLUS about 10 degrees. As the heliplane forward velocity increases along its upward and increasingly inclined path, the wings and the stabilizers provide a greater and greater contribution to the lift of the heliplane. The path followed by the heliplane C.G. is determined by the request made by the pilot as to how high and how fast he wanted the heliplane to be and fly at the end of the takeoff phase. Also, during that phase, the overall path can be composed of various segments of path that correspond to different combinations of altitude and velocity that the pilot might choose, as time goes, and as the circumstances and flight conditions warrant. At any instant, regardless, the angles of attack of the wings and of the stabilizers, the total power required, the power ratio between gyrating blades and propeller, the gyrating blade rotational speed, their collective pitch, the propeller rotational speed and its pitch adjustment are all monitored, adjusted and controlled to optimize the various phases and steps of the transient operation between hovering and horizontal forward flight, and yield the proper response to the pilot's demand regarding the final flight conditions that he wished to reach. Any abrupt and speedy combined changes in craft altitude and velocity are also handled in that manner during the forward flight mode.

The landing operation requires the pilot and the craft to follow the reverse procedure during the transient phase between forward flight, at a velocity slightly higher than the stalling speed of the wings, and hovering over the spot where the pilot wishes to land the craft. Based on the craft velocity and altitude, the distance from the landing spot and how fast the pilot wishes to land, the variations of: propeller and gyrating blade rotating speed and pitch angle, engine power, power ratio between propeller and gyrating blades, angles of attack of the stabilizers and wings; are all continuously monitored and adjusted as programmed to respond to the pilot's request for landing. The chord lines of the profiles of the wings and of the stabilizers move from a position almost horizontal, at the beginning of the landing operation, to end in a vertical position when the heliplane is hovering over the landing spot, all in a manner exactly inverse from that earlier described for the takeoff phase. During both transient phases of takeoff and landing, the influences of the airstreams of both the gyrating blades and the propeller on the wings and the stabilizers, respectively, are factored in by the Coordinating Control System to be taken into account, so that these control surfaces are both properly positioned at all times, with the corrections being included.

Three other aspects of the heliplane operation are related to the reactions of the airstream generated by the gyrating blades: (1) the improvement in wing stalling behavior; (2) the use of the wings during the hovering operation to counter the gyrating blade torque, if all blades gyrate in the same direction; and (3) the use of the wings to compensate for gyroscopic moments, during forward flight, in the case again of all blades gyrating in the same direction. It is obvious and self-understanding that (2) and (3) do not pertain to the heliplane configuration in which the gyrating blades are counterrotating and all gyrating at the same speed. In this latter case, the torques generated by each pair of blades cancel each other. The two gyroscopic moments generated by the disks formed by each pair of blades have opposite directions and also cancel each other. No torque and no moment is thus transmitted to the craft fuselage in that case. The reactions between the counteracting torques and moments are resisted by the parts directly connected to each pair of blades and to the various components that are interposed between these parts. A fourth aspect of the useful influence of the gyrating blade downward airstream on the wings pertains to the possibility of eliminating the gyrating blade cyclic pitch, also in the case of the blades all gyrating in the same direction, during forward flight. This is discussed later in this section.

FIG. 21 shows a typical profile of a wing cross-section. When the angle of attack $\alpha$ increases beyond a value at which the profile lift peaks, the airflow along the upper surface of the airfoil detaches itself from that surface at point X for instance, and the lift force F suddenly decreases. The stall condition has then been reached. Several means are available to delay the onset of such a condition and one is naturally provided in the case of the heliplane wings: the downward airstream generated by the gyrating blades which moves in the direction of arrow f. Also, during forward flight, this airstream combines with the airflow created by the craft forward velocity to change the apparent direction of the velocity vector $V_o'$ of FIG. 21 and tilt that vector counterclockwise (direction of arrow $v$). This means that the apparent angle of attack of the wing is smaller than $\alpha$, or that the effective stalling angle of the wing is larger than it would be in the case of an airplane. Those two effects combine and this results in: (1) a stall angle and lift capacity for the wings larger than would otherwise be obtainable under similar flight conditions for an airplane, and (2) cancellation of most of the effects of the gyrating blade airstream impinging on the wings underneath. The heliplane wings shown in FIG. 1 are very short but would actually be much longer, probably as long or longer than the gyrating blades, but with a chord line shorter than that shown in FIG. 1, especially for high performance (high velocity) heliplane designs.

In the heliplane configuration shown in FIGS. 1 and 3 (blades all gyrating in the same direction), the gyrating blades dynamically behave as they would in a helicopter with blades gyrating in the same direction. As is well known, any rotating motion of disk $\Delta$ around any axis other than an axis parallel to the vertical axis around which the blades gyrate causes gyroscopic moments. As the heliplane flies forward, normal flight maneuvers involving pitch and roll motions of the craft (not yaw, however), and any combinations thereof, automatically generate such moments. These moments are then imparted to the fuselage which responds accordingly. If this response is to be eliminated, another moment of equal magnitude and of inverse direction must be generated simultaneously and automatically. This is performed by the wing, stabilizer and vertical fin control surfaces as they are adjusted correspondingly by their respective actuators which received signals from the Coordinating Control System. As the pilot's command is transmitted to the C.C.S. for the roll, pitch and/or yaw variations that he wants, based on the gyrating rotational speed of the blades, the C.C.S. automatically correct the signal that would have been sent to the actuators of the various craft control surfaces, were it not for the existence (and influence) of such a gyroscopic moment. Because both the mass of the gyrating blades and the effective moment of inertia of disk $\Delta$ are constant and of course known, only the gyration rate of the blades can affect the magnitude of this gyroscopic moment, for a given craft maneuver. The gyration rate is constantly monitored and adjusted by the C.C.S. and can easily be taken into account in the signal correction mentioned above. As an example, if a blade-created gyroscopic moment were to induce a rolling action of the craft, the angle of attack of both wings would be differentially adjusted to compensate for such an unwanted roll response of the craft. If a blade-created gyroscopic moment were to induce a pitching action of the craft, the angle of attack of the stabilizers would then be adjusted correspondingly to cancel that pitch response of the craft. It is simple to understand how a combination of pitch, roll and/or yaw motions can just as easily be handled automatically and simultaneously.

Because the propeller airstream interacts with both the vertical fin and the stabilizer (or can be made to do so intentionally), it seems more logical to use that airstream to generate a side force on the vertical fin, by changing its orientation, especially during the hovering operation mode, when no thrust is needed from the propeller and the vertical fin is not used for craft control. The little thrust generated by the propeller can easily be cancelled by a very small variation of the craft pitch angle, which can be achieved by slightly deflecting the stabilizers, thereby generating a small hrizontal component of the lift force generated by the gyrating blades. The moment thus generated by the vertical fin cancels the torque generated by the blades, when they all rotate in the same direction, and eliminates the need for turning the propeller around a vertical axis as shown in FIG. 7. A slight differential rotation of the wings, then in a vertical position, will also generate such a counteracting moment on the craft, as required. These examples amply illustrate the flexibility of the heliplane operation and also the need for and use of the Coordinating Control System.

Without the assistance provided by the C.C.S., a heliplane would be very difficult to operate safely and consistently at its peak capability. Only a very well trained pilot could. With the C.C.S. assistance, however, the task becomes simpler and safer than piloting an airplane and especially a helicopter. But, even the best systems are known to fail occasionally and an ordinary pilot might have to face the problem of handling a heliplane without the help of the C.C.S., when faced with its failure while flying a heliplane in the forward flight mode. The safest and easiest way for him to proceed would then be to keep flying to a location where landing is safe, avoiding any fast craft maneuvers and according to a preset schedule of slow changes and adjustments in the various controls, at all times. Also, a well trained and experienced pilot should be given the option to override the C.C.S. operation, whenever he feels the need, during special craft maneuvers in the hovering and forward flight operational modes. The C.C.S., or part of it, would then be by-passed. This feature could be essential for training pilots. Also, the threshold levels, for each control component, at which the override or by-pass becomes effective, and the selection of control to be by-passed, can be left to the pilot to elect as the need warrants.

One major difference between a heliplane and a helicopter resides in not using the cyclic pitch of the gyrating blades to generate a forward thrust. The blades are left free to adjust their cyclic pitch variation so as to eliminate the creation of a rolling moment on the craft, in forward flight. However, because any rolling moment, induced by means other than the craft control surfaces, can be balanced, as earlier mentioned, by extraneously generated corrective moments applied to the craft, the need for letting the blades adjust their cyclic pitch is not altogether essential for all heliplane configurations and designs. In the counterrotating blade configuration, the moments generated by each pair of blades cancel each other, except for the second order interactions between the airstream generated by the upper pair of gyrating blades and the lower pair of blades. The following discussion is limited to the simplest case in which all blades gyrate in the same direction. In such case, also, the lift force contributed by the wings should be, at high craft velocities, the major contribution to the total lift, in which case, the blade collective pitch can be somewhat decreased to decrease further the lift contribution of the gyrating blades. The angle of attack of each wing is adjusted, as the heliplane forward velocity varies, in a manner such that the lift difference between each wing equals and balances the lift difference between each half side of disk $\Delta$, at all times. Again, during craft flight maneuvers, the C.C.S. assistance is of paramount importance for such a heliplane configuration. The elimination of the blade cyclic pitch variation is easily achieved by preventing center bodies 105 and 115 of FIGS. 9, 11, 12 and 13 from rotating around the blade longitudinal axes. Blades 20-21 and 17-19 are then simply prevented from oscillating around their longitudinal axes.

The gyrating blades should be as light as possible and constructed with strong and stiff materials, so that the centrifugal forces, and blade elongation caused thereby, are minimized. In the case of rigid blades, the centrifugal forces exerted by the blades in each pair are directly transmitted to and reacted by each other by means of hub housings 36 and 116 of FIG. 9. However, in the case of twistable blades, the two main parts of the blade, skin/structure assembly and control axle 35', are solidly attached to each other only at the blade tip by means of end spar 160. Any differential movement of these two main parts is made impossible by attaching both ends of these two main parts, closely to each other, to massive hub axle 35. This eliminates the influence of the centrifugal force on the amount of blade twist imposed by control axle 35' to blade 20 skin and supporting structure.

Because control of the cyclic pitch of the gyrating blades is totally lacking in the case of a heliplane, sideways motion of the craft cannot be simply and effectively induced. However, by reversing the pitch angle of the propeller blades, thrust directed backward can be generated and thereby impart a backward motion onto the craft. It is unlikely that any pilot of a heliplane would want to fly fast backward, for long periods of time. It is therefore unimportant to discuss extensively how such a motion could affect the operation of the craft and of its major components. However, for short periods of time and at relatively low craft velocities, all control surfaces and the gyrating blades can easily accommodate such a mode of operation, without requiring additional special adaptation of parts and components. From the long prior discussion of the capability of the C.C.S. and of the possibility of rotation given to the craft control surfaces, it can easily be deduced that these control surfaces can be given "negative" angles of attack so that, at low craft backward velocities, given the proper signals and actuations, the craft can fly backward, when the C.C.S. is caused to reverse all proper signals accordingly and automatically, the way a car is put in reverse gear. It is obvious that backward movement of the craft should be attempted only from the hovering operation mode and without trying to change altitude appreciably and/or imposing quick and complex maneuvers onto the craft. Such a capability could prove very useful in flight circumstances in which not enough space is available to turn the craft around to back out of such spaces. The sideway motion of the heliplane on the ground is also impossible, but not its backward motion for the reasons just discussed. This possibility could be useful for taxiing maneuvers. Adapting skis to the landing structure gives the heliplane the possibility to move on snow-covered ground. In this instance, sideway motion is impossible and not essential. Adapting floats to the landing structure allows the heliplane to take off from and land on water. In such applications, a sideway movement capability could be attractive and useful, but is not available. However, the heliplane can orient itself on the spot by using the propeller and rotating it 90°. On water, the backward motion capability could be very useful to facilitate mooring operations.

Especially in the case of counterrotating blades, the actuation mechanisms of the blade collective pitch and the rotating freedom given to the blades to accommodate the cyclic pitching adjustment, combined together as shown in FIG. 9 within two concentric power shafts, form what may seem a complex and fragile assembly. It is yet much less so than the swash plate and actuating linkages typical of helicopters. At least, all moving parts are enclosed inside an outer shell that can easily be efficiently sealed. This provides the means to isolate these mechanisms from the environmental hazards to which such crafts are usually exposed under normal operational conditions. It also insures that all mechanisms can be properly lubricated, thereby minimizing wear and prolonging the operational life of these parts and minimizing the risks of fatal failure of any critical component or part of the blade control and actuating systems.

The operational and functional differences between the heliplane on one hand and helicopters and airplanes on the other hand have already been identified and discussed. The differences in potentially achievable performance and in ranges and varieties of uses have not. Potentially heliplanes can basically do what both airplanes and helicopters can do, with one limitation that is discussed below. This limitation pertains to speed performance. For obvious reasons, heliplanes will never be able to compete and compare with high speed propeller airplanes. But, they surely appear capable of flying faster than helicopters.

The following discussion is therefore limited to the speed performance aspect of heliplanes as compared to helicopters. These have now been developed to the extent that their peak capability has now been reached, in terms of maximum speed. Except for new versions with higher speed potential, now being studied for military applications, this maximum speed is approximately 200 mph. One reason for this limitation is a falling off of the helicopter performance curve (ratio of lift capability to torque required as a function of the ratio of helicopter forward velocity to blade tip velocity) beyond a value of about one fifth for the ratio of forward to blade tip velocities. The second reason, related to the first one, is that at maximum tip velocities of about 450 mph, the blade tip profile performance (ratio of the profile lift to drag) decreases appreciably (Mach Number of 0.7 for the blade tip moving forward). The combination of these two numbers (one fifth and 450 mph) indicates that the peak economical performance of an helicopter occurs at forward velocities of approximately 100 mph. Although a peak velocity of 200 mph is mentioned above, an economical cruising speed limitation of only half of that seems sensible to assume for the purpose of a meaningful comparison.

In the case of the heliplane, at forward velocities above 150 mph, a considerable portion of the craft lift is then provided by the wings. The combination of propeller and wings becomes then a much more efficient way to generate lift. The rate of gyration of the blades can then be decreased to lower the maximum blade tip velocity, thus allowing the heliplane forward velocity to be increased without causing the blade tip maximum velocity to exceed the earlier mentioned limit of 450 mph. It should be mentioned here again that the maximum blade tip velocity is the sum of the craft forward velocity, with respect to the air, and of the blade tip velocity at the point where the blade longitudinal axis is orthogonal with the craft longitudinal axis. Therefore, decreasing the blade gyration speed lowers the sum of these two velocities. The craft forward velocity can be increased by the amount of decrease of the blade tip velocity, while the 450-mph maximum blade tip velocity remains constant. The loss of lift from the gyrating blades, because of the reduction in their gyration rate, can then be compensated by an increase of the collective pitch angle of these blades, whenever the circumstances warrant and the heliplane design allows. This flexibility is of course totally lacking in the case of helicopters. This is a reason why the high performance versions of new proposed helicopters all have some form of wings. It seems that an optimization of the proper combination of the heliplane intended operation and its design parameters can result in the following typical performances: an economical cruise velocity of 200 to 250 mph with peak velocities of 350 to 400 mph. For most commercial and non-military uses and applications, such potentially achievable velocity performance bridges the large velocity gap that presently exists between airplanes and helicopters. Some of the lifting capacity performance, inherent to helicopters, is lost in this worthwhile trade-off process.

For all applications and uses that require neither high lifting capability nor speeds beyond 350 mph, the heliplane can replace and be competitive with both airplanes and helicopters, while being able to perform any specific task expected from either. The various services and applications for which both airplanes and helicopters are now used are well known and need not be discussed here. It is obvious that an aircraft capable of operating and performing like either one of those two other aircrafts is more economical to use, because the total number of crafts required in any given fleet would be smaller. Even private individuals may prefer owning and operating one heliplane instead of one airplane plus one helicopter. Heliplanes should have a useful life longer than that of helicopters and be less costly to service and maintain. If airplanes are eliminated from any fleet of flying vehicles, the operation of such a fleet requires no landing and taxiing facilities, and can be set up away from congested airports, almost in any open space. A greater number of locations can thus be served directly. Any water surface, such as a small lake for instance, would suffice, wherever it appears economically justified. Access by air with heliplanes to such locations is easy: no landing approach and no wind direction restriction. Transportation from one location to another is fast and time efficient. Also, when all aspects of operating airplanes and helicopters are considered, the heliplane should prove safer to fly and operate than either one of the other two types of aircrafts. Eliminating the craft speed of airplanes near ground level, the risks of helicopter flying because of their inherent instability, the total number of aircrafts needed for the same sum total of tasks to be performed and the air traffic concentration required by airplanes close to ground level, should contribute to a substantial decrease of the risks normally associated with air transportation per passenger-mile and/or ton-mile. The heliplane offers the potential of less expensive and safer air transportation, at speeds twice those of helicopters but still comparable to those of small propeller-type airplanes, from and to a vastly larger number of possible locations and more easily accessible.

Having thus described my invention, I claim:

1. An aircraft comprising:
   an elongate fuselage;
   a pair of wings extending from either side of an intermediate portion of the fuselage;
   a plurality of movable control surfaces extending from a rear portion of the fuselage;
   a pair of rotors each having two opposite blades, the blades of each rotor mounted for limited rotation about a common substantially horizontal pitch axis to vary the pitch thereof;
   means for mounting the rotors onto an upper portion of the fuselage for rotation and at a fixed angular position relative to and about a common substantially vertical axis;
   a motor mounted in the fuselage for driving said rotors;
   means mounted on the fuselage for providing a forward thrust;
   pilot control means for selectively varying the collective pitch of the blades of the rotors for producing a lift force on the aircraft; and
   means for mounting and coupling oppositely mounted blades for maintaining axial alignment and for rotation together and for limited free rotation about the horizontal pitch axis in response to a set of aerodynamic torques applied thereon and for continuous balancing of said torques, resulting in self-adjusting cyclic pitch of said blades during rotation of the rotors about their vertical axis in response solely to airstream forces acting thereupon and resulting from the aircraft forward speed.

2. An aircraft according to claim 1 wherein each blade has a construction which permits rotation of a tip of the blade relative to a root thereof.

3. An aircraft according to claim 2 and further comprising:
   means for simultaneously adjusting the pitch of the blades along their lengths by rotating the tips thereof relative to the roots thereof.

4. An aircraft according to claim 1 wherein the drive connection means rotates the rotors in opposite direction.

5. An aircraft according to claim 1 wherein the drive connection means rotates the rotors in the same direction.

6. An aircraft according to claim 1 wherein the wings are mounted onto the fuselage for rotation about a substantially horizontal axis.

7. An aircraft according to claim 1 wherein each rotor has its pair of blades connected by a solid shaft so that the two blades of each pair rotate about a common horizontal axis as one body.

8. An aircraft according to claim 6 wherein the forward thrust providing means includes a propeller and second drive means for connecting the propeller and the motor.

9. An aircraft according to claim 8 wherein the propeller is positioned at the aircraft tail end, said propeller having a plurality of blades forming a disk as the propeller rotates, the propeller disk rotating in a substantially vertical plane, said propeller disk being rotatable about a substantially vertical axis so as to produce a lateral component of its thrust for enabling the propeller to apply a torque on the aircraft about the vertical axis thereof.

10. An aircraft according to claim 7 wherein the solid shaft connecting the blades of a pair causes the centrifugal force generated by each blade to counteract and cancel one another directly.

11. An aircraft according to claim 1 wherein the means for varying the collective pitch of the blades are enclosed within and protected by the means for driving the rotor.

12. An aircraft according to claim 6 wherein the rotatable wings reach a quasi vertical position during hovering and the early phase of transitory flight for enabling the blade downwash airstream to produce a torque about the aircraft vertical axis.

13. An aircraft according to claim 9 and further comprising:
means for actuating the wings in their rotation;
means for actuating the movable control surfaces;
means for adjusting and reversing the pitch of the propeller blades; and
means for controlling the wings actuation means, the control surfaces actuation means and the means for adjusting and reversing the pitch of the propeller blades;
wherein the controlling means generates coordinated command signals for actuating the wings and the movable control surfaces, and adjusting and reversing the propeller blade pitch; and
whereby inverting the signals generated by the controlling means enables the aircraft to move backward in flight.

14. An aircraft according to claim 6 wherein the rotor downwash airstream during aircraft forward flight provides the means for retarding the onset of aerodynamic stalling of the wings.

15. An aircraft according to claim 12 wherein the wing rotation actuating means enables each wing to be angularly positioned independently about its quasi vertical orientation, thus enabling said angular position of each wing to be adjusted differently during hovering flight, thereby providing means for producing a torque resulting from the differential action of the rotor downwash airstream on the wings, said torque being applied onto the aircraft for balancing the torque exerted by the rotors on said aircraft when said rotors rotate in the same direction.

16. An aircraft according to claim 1 wherein the means for varying the collective pitch of the rotor blades automatically sets the average, during each rotor full revolution, between the maximum and of the minimum amplitudes of the cyclic pitch adjustment over said rotor full revolution.

17. A method of propelling an aircraft including an elongate fuselage, a pair of wings extending from either side of an intermediate portion of the fuselage, a plurality of movable control surfaces extending from a rear portion of the fuselage, a pair of rotors each having two opposite blades each mounted for limited rotation about a common substantially horizontal pitch axis to vary the pitch thereof, means for mounting the rotors onto an upper portion of the fuselage for rotation and at a fixed angular position relative to and about a common substantially vertical axis, a motor mounted in the fuselage for driving said rotors, means mounted on the fuselage for providing a forward thrust, pilot control means for selectively varying the collective pitch of the blades of the rotors for producing a lift force on the aircraft, and means for mounting and coupling oppositely mounted blades for maintaining axial alignment and for rotation together and for limited free rotation about the horizontal pitch axis in response to a set of aerodynamic torques applied thereon and for continuous balancing of said torques, which results in a self-adjusting cyclic pitch of said blades during rotation of the rotors about their vertical axes in response solely to airstream forces acting thereupon and resulting from the aircraft forward speed, said method comprising the steps of:
adjusting the collective pitch of the rotor blades for producing a substantially vertical upwardly directed thrust for lifting the aircraft during hovering flight;
adjusting the forward directed thrust produced by the means mounted on the fuselage for providing a forward thrust for forward aircraft flight; and
enabling the cyclic pitch of the rotor blades to adjust continuously and automatically in response solely to the aircraft forward speed without need of pilot's control action;
whereby the aircraft pilot controls the aircraft speed solely by adjusting the means mounted on the fuselage for providing a forward thrust and the collective pitch of the rotor blades.

18. The method recited in claim 17 wherein the wings are mounted onto the fuselage for rotation about a substantially horizontal axis and the means mounted on the fuselage for providing a forward thrust includes a propeller, said method comprising the further steps of:
adjusting the angular orientation of the wings during hovering flight into a substantially vertical position; and
continuously and progressively adjusting said angular orientation of the wings from a substantially vertical position to a substantially horizontal position as the aircraft operation progresses from hovering flight into forward flight, during a transitory period when the aircraft gradually accelerates forward.

19. The method recited in claim 18 wherein said aircraft further includes means for actuating the wings in their rotation, means for actuating the movable control surfaces, means for adjusting and reversing the pitch of the propeller blades and means for controlling the wings actuation means, the movable control surfaces actuation means and the propeller blades pitch adjusting and reversing means, said method comprising the further steps of:

generating command signals by the controlling means;

receiving said command signals by the wings actuation means, the movable control surfaces actuation means and the propeller blades pitch adjusting and reversing means; and coordinating said signals in a manner such that the resulting forces and torques exerted on the aircraft vary gradually, concomitantly and progressively.

20. The method recited in claim 19 wherein means is provided for inverting the command signals, said method comprising the further steps of:

reversing the propeller thrust direction;

decelerating the aircraft into hovering flight mode;

reversing the actuation of the movable control surfaces;

reversing the actuation of the rotation of the wings; and causing the aircraft to move backward, as needed;

whereby the operation of the rotor blades remains unaffected, the collective pitch adjustment remains unchanged and the aircraft is enabled to reverse its flight motion.

* * * * *